(12) United States Patent
Koch

(10) Patent No.: US 11,469,585 B2
(45) Date of Patent: Oct. 11, 2022

(54) CIRCUIT BREAKER AND METHOD FOR OPERATING SAME

(71) Applicant: Eaton Intelligent Power Limited, Dublin (IE)

(72) Inventor: Michael Koch, Korneuburg (AT)

(73) Assignee: Eaton Intelligent Power Limited, Dublin (IE)

( * ) Notice: Subject to any disclaimer, the term of this patent is extended or adjusted under 35 U.S.C. 154(b) by 14 days.

(21) Appl. No.: 16/650,391

(22) PCT Filed: Sep. 25, 2018

(86) PCT No.: PCT/EP2018/075856
§ 371 (c)(1),
(2) Date: Mar. 25, 2020

(87) PCT Pub. No.: WO2019/063502
PCT Pub. Date: Apr. 4, 2019

(65) Prior Publication Data
US 2021/0210945 A1 Jul. 8, 2021

(30) Foreign Application Priority Data
Sep. 26, 2017 (DE) ............. 10 2017 122 220.0

(51) Int. Cl.
*H02H 3/02* (2006.01)
*H02H 3/08* (2006.01)
(52) U.S. Cl.
CPC ............. *H02H 3/021* (2013.01); *H02H 3/08* (2013.01)

(58) Field of Classification Search
CPC ............ H02H 3/021; H02H 3/08; H02H 3/02; H01H 9/54; H01H 83/14
USPC ........................................................ 361/93.1
See application file for complete search history.

(56) References Cited

U.S. PATENT DOCUMENTS

| 3,517,300 A | * | 6/1970 | McMurray ............ H02M 5/293 363/160 |
| 8,817,427 B2 | | 8/2014 | Berggren et al. |
| 2014/0104734 A1 | | 4/2014 | Alejo et al. |
| 2014/0145779 A1 | * | 5/2014 | Gediga ................. H03K 17/14 327/378 |

(Continued)

FOREIGN PATENT DOCUMENTS

| DE | 4235138 A1 | | 4/1994 |
| GB | 2182812 A | * | 5/1987 ............... H02H 3/06 |

(Continued)

*Primary Examiner* — Thienvu V Tran
*Assistant Examiner* — Sreeya Sreevatsa
(74) *Attorney, Agent, or Firm* — Leydig, Voit & Mayer, Ltd.

(57) ABSTRACT

A method for operating a circuit breaker includes: initiating a shutdown process when a fault current caused by body contact or ground contact is detected; and during the shutdown process, reducing a voltage value between a neutral conductor and at least one current-carrying conductor at an output of the circuit breaker to substantially zero from an operating-voltage value according to a predetermined shutdown curve by a shutdown unit. During the shutdown process, the circuit is not suddenly interrupted, but the voltage value is reduced from a starting point according to the shutdown curve and only reaches substantially zero after a predetermined first time period.

12 Claims, 4 Drawing Sheets

(56) References Cited

U.S. PATENT DOCUMENTS

| | | | |
|---|---|---|---|
| 2015/0002977 A1 | 1/2015 | Collet et al. | |
| 2017/0213678 A1* | 7/2017 | Tanabe | H02H 7/20 |
| 2019/0371557 A1* | 12/2019 | Haslinger | H01H 71/08 |
| 2020/0162070 A1* | 5/2020 | Masten, Jr. | H02H 3/044 |

FOREIGN PATENT DOCUMENTS

| | | |
|---|---|---|
| WO | WO 2012153276 A1 | 11/2012 |
| WO | WO 2017116296 A1 | 7/2017 |

\* cited by examiner

CIRCUIT BREAKER AND METHOD FOR OPERATING SAME

CROSS-REFERENCE TO PRIOR APPLICATIONS

This application is a U.S. National Phase application under 35 U.S.C. § 371 of International Application No. PCT/EP2018/075856, filed on Sep. 25, 2018, and claims benefit to German Patent Application No. DE 10 2017 122 220.0, filed on Sep. 26, 2017. The International Application was published in German on Apr. 4, 2019 as WO/2019/063502 under PCT Article 21(2).

FIELD

The invention relates to a method for operating a circuit breaker.

BACKGROUND

Circuit breakers are known which interrupt the circuit when a fault current is detected. Such fault currents can be caused by some of the current not discharging through the neutral conductor, but by a person coming into contact with the circuit and the current discharging through the person to ground. It is known here that there is a correlation between the level of the fault current, the duration of the fault current and the probability of ventricular fibrillation occurring in the person affected. Conventional circuit breakers are therefore configured such that the circuit breaker interrupts the circuit within a predetermined time period if a fault current occurs above the predetermined limit value. In this case, the circuit is essentially interrupted suddenly, for example by opening the switching contacts in order keep the duration for which the person is exposed to the fault current short.

Known fault-current circuit breakers therefore interrupt a circuit as quickly as possible, with the disconnection or interruption of the circuit taking place suddenly.

The drawback is that, even if the circuit is interrupted in the event of a fault current within the intended time period, ventricular fibrillation can still occur in the person affected.

US 2014/104734 A1, US 2015/002977 A1, DE 42 35 138 A1, U.S. Pat. No. 8,817,427 B2 and WO 2017/116296 A1 each disclose circuit-breaker devices which are configured for detecting overcurrents or short circuits. None of these documents relates to protection against ground fault currents or body fault currents. None of these documents discloses a so-called fault-current circuit breaker. None of these documents discloses a slow shutdown instead of a sudden shutdown process.

The problem addressed by the invention is therefore to provide a method of the type mentioned at the outset by means of which said drawbacks can be avoided and the occurrence of ventricular fibrillation in persons affected can be reduced.

SUMMARY

In an embodiment, the present invention provides a method for operating a circuit breaker, comprising: initiating a shutdown process when a fault current caused by body contact or ground contact is detected; and during the shutdown process, reducing a voltage value between a neutral conductor and at least one current-carrying conductor at an output of the circuit breaker to substantially zero from an operating-voltage value according to a predetermined shutdown curve by a shutdown unit, wherein, during the shutdown process, the circuit is not suddenly interrupted, but the voltage value is reduced from a starting point according to the shutdown curve and only reaches substantially zero after a predetermined first time period.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

This results in the advantage that the occurrence of ventricular fibrillation in the persons affected in the event of electric shocks can be reduced, meaning that the safety of users of electrical appliances can be significantly increased. Here, tests have shown that, with conventional circuit breakers, ventricular fibrillation can occur if a sudden shutdown process, which is standard per se, takes place during the phase in which the heart is vulnerable. By using a predetermined shutdown curve and therefore a predetermined progression of the voltage value over time during the shutdown process instead of a sudden shutdown process having a large drop in voltage, the probability of the occurrence of ventricular fibrillation can be reduced since there is not a large drop in voltage during the phase in which the heart is vulnerable.

The invention further relates to a circuit breaker as described herein.

In an embodiment, the present invention provides a circuit breaker of the type mentioned at the outset by means of which said drawbacks can be avoided and the occurrence of ventricular fibrillation in persons affected can be reduced.

The advantages of the circuit breaker correspond to the above advantages of the method.

Figure 8:
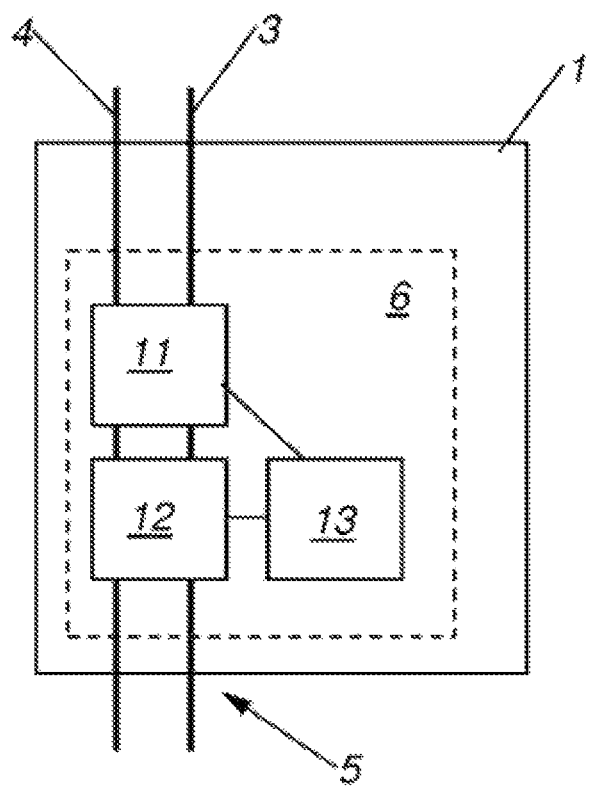
FIG. 8 is a schematic view of a preferred embodiment of a circuit breaker.

FIG. 8 shows a preferred embodiment of a circuit breaker 1 comprising a neutral conductor 3, at least one current-carrying conductor 4 and a shutdown unit 6, the shutdown unit 6 being configured to carry out a shutdown process when a fault current is detected by a fault-current detector 11.

The circuit breaker 1 is a switching apparatus providing contact-voltage protection which interrupts an electrical circuit as soon as a predetermined level of fault current, caused by body contact or other ground contact, is detected.

In order to interrupt the electrical circuit, a circuit breaker 1 comprises a shutdown unit 6 which, if a predetermined level of fault current is detected, interrupts the electrical circuit formed by the neutral conductor 3 and the at least one current-carrying conductor 4, in particular all the current-carrying conductors 4.

The process in which the circuit breaker 1 interrupts the electrical circuit is referred to as a shutdown process, but can also be referred to as tripping the circuit breaker 1. The shutdown unit 6 may particularly preferably comprise a fault-current detector 11 in order to detect the fault current. In this case, the circuit breaker 1 is configured as a fault-current circuit breaker. In this case, the fault-current detector 11 monitors the neutral conductor 3 and the at least one current-carrying conductor 4, in particular all the current-carrying conductors 4, which connect an electrically downstream sub-network to an upstream electricity supply network. The fault-current detector 11 may in particular be configured as a differential current transformer, for example for alternating current. Alternatively, the fault-current detector 11 may be configured as a Foerster probe or as a shunt resistor, for example for direct current.

Alternatively, the shutdown unit 6 may comprise an input for a fault-current signal. In this case, a fault-current detector 11 can be arranged so as to be remote from the circuit breaker 1, and can output a fault-current signal if a fault current is detected. The fault-current signal is transmitted to the shutdown unit 6 of the circuit breaker 1 in a wired or wireless manner, as result of which the circuit breaker 1 can be shut down remotely when a fault current is detected.

Figure 1:
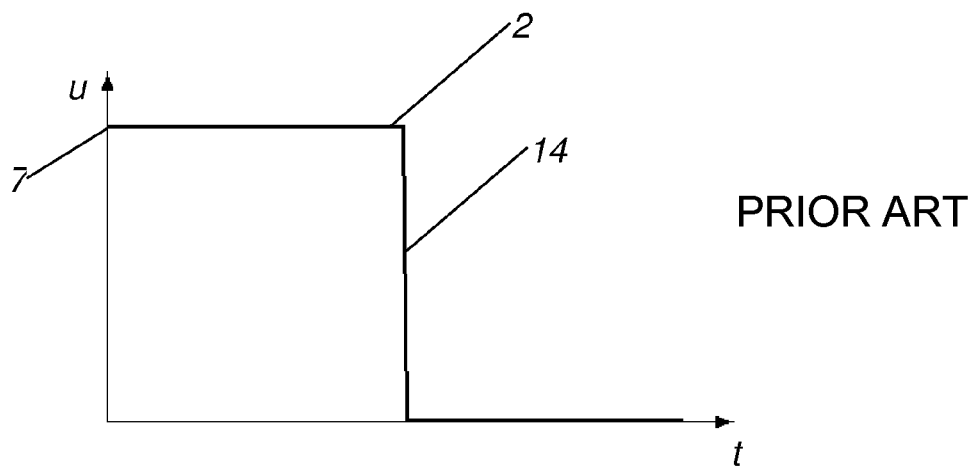
FIG. 1 shows the voltage curve during a shutdown process of a conventional circuit breaker.

According to the prior art, the electrical circuit is disconnected suddenly during the shutdown process, whether this is by opening switching contacts or immediately switching a semiconductor switch 12 to an off-state resistance. FIG. 1 shows, by way of example, how a shutdown process proceeds according to the prior art with regard to the voltage value 2 between the neutral conductor 3 and at least one current-carrying conductor 4 at an output 5 of a circuit breaker 1. By opening the switching contacts or immediately switching a semiconductor switch 12 to an off-state resistance, the voltage value 2 suddenly drops at a single sudden-change point 14 over time from the operating-voltage value 7 to substantially zero. Since, with a sufficiently high temporal resolution, when considered physically, even opening switching contacts or immediately switching a semiconductor switch 12 do not take place instantaneously, processes which taken less than 1 ms are considered sudden in the following.

Figure 2:
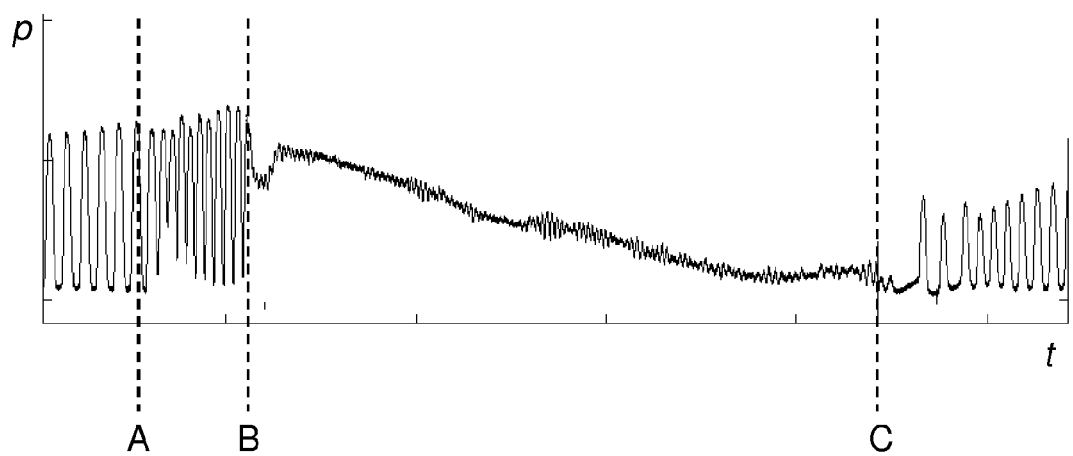
FIG. 2 shows the pressure curve of a left ventricle as part of a test.

FIG. 2 shows a graph of a test of an isolated rabbit heart, with the graph showing the pressure curve of the left ventricle over time. Up to position A, the cardiac rhythm is normal. At position A, an external electrical DC voltage is applied to the heart. Tachycardia with increased heart rate is observed, but the pumping performance of the heart remains. In position B, the DC voltage is switched off with behavior as shown in FIG. 1, with the shutdown process taking place during the phase in which the heart is vulnerable. The phase in which the heart is vulnerable is a brief time period in the cardiac cycle in which cardiac cells are in an indeterminate electrical state. Ventricular fibrillation of the heart is triggered by the shutdown process within the phase in which the heart is vulnerable and by the associated sharp drop in voltage. In position C, the normal cardiac rhythm is restored by an electrical defibrillation pulse.

It is therefore provided that, during a shutdown process, the shutdown unit 6 is configured to reduce a voltage value 2 between the neutral conductor 3 and the at least one current-carrying conductor 4 at an output 5 of the circuit breaker 1 to substantially zero from an operating-voltage value 7 according to a predetermined shutdown curve 8, the voltage value 2 being reduced from a starting point 9 according to the shutdown curve 8 and only reaching substantially zero after a predetermined first time period. The voltage value 2 corresponds to the effective voltage and therefore, for alternating current, not necessarily to the temporally variable voltage. Here, the output 5 of the circuit breaker 1 is the electrical contact of the circuit breaker 1 which is facing the electrically downstream sub-network. The operating-voltage value 7 is the voltage value 2 which is applied to the output 5 of the circuit breaker between the neutral conductor 3 and the least one current-carrying conductor 4 when the circuit breaker 1 is switched on. The shutdown process corresponds to the shutdown of the circuit breaker 1, during which the voltage value 2 is reduced to substantially zero in order to disconnect the sub-network from the electricity supply network. In this case, substantially zero is a voltage value 2 that is inconsequential for the sub-network and can occur if the disconnection is carried out by a semiconductor switch 12 which has a very high but not infinitely high off-state resistance.

The shutdown unit 6 is configured such that, in a shutdown process, the circuit is not suddenly interrupted, but instead the voltage value 2 is reduced to substantially zero in the shutdown process over a first time period and according to the predetermined shutdown curve 8. Therefore, the voltage value 2 is reduced from a starting point 9 according to the shutdown curve 8, the voltage value 2 reaching substantially zero at an end point 10 that is spaced apart from the starting point 9 by the predetermined first time period. The risk of ventricular fibrillation is therefore reduced not only by shutting down as quickly as possible, but also by the controlled form in which the voltage value 2 is guided towards substantially zero in the shutdown process. The voltage value 2 of substantially zero corresponds to a shutdown state of the circuit breaker 1 here. In this case, the shutdown curve 8 is configured such that the voltage value 2 is reduced from a starting point 9, and the voltage value 2 only reaches substantially zero after the predeterminable first time period. The drop in the voltage value 2 from the operating voltage 7 to substantially zero therefore does not take place suddenly, but rather over the predetermined first time period.

This results in the advantage that the occurrence of ventricular fibrillation in the persons affected in the event of electric shocks can be reduced, meaning that the safety of users of electrical appliances can be significantly increased. Here, tests have shown that, with conventional circuit breakers 1, ventricular fibrillation can occur if a sudden shutdown process, which is standard per se, takes place during the phase in which the heart is vulnerable. By using a predetermined shutdown curve and therefore a predetermined progression of the voltage value 2 over time during the shutdown process instead of a sudden shutdown process having a large drop in voltage, the probability of the occurrence of ventricular fibrillation can be reduced since there is not a large drop in voltage during the phase in which the heart is vulnerable.

Furthermore, a method for operating the circuit breaker 1 is provided, wherein, when a fault current is detected, the shutdown process is initiated, wherein, during the shutdown process, the voltage value 2 between the neutral conductor 3 and the at least one current-carrying conductor 4 at the output 5 of the circuit breaker 1 is reduced to substantially zero from the operating-voltage value 7 according to the predetermined shutdown curve 8 by the shutdown unit 6, wherein the voltage value 2 is reduced from the starting point 9 according to the shutdown curve 8 and only reaches substantially zero after a predetermined first time period.

Particularly preferably, it may be provided that a direct current is applied between the neutral conductor 3 and the at least one current-carrying conductor 4. The circuit breaker 1 can therefore be particularly preferably designed for direct current. With direct current, the voltage value 2 can in particular correspond to the voltage that is actually being applied. The described method and the circuit breaker 1 are particularly advantageous with a direct current, since, for a direct current in comparison with an alternating current, higher current intensities are possible as a fault current without ventricular fibrillation occurring while the current is flowing through the body of the person affected. For this reason, the actual drop in voltage during a shutdown process of the circuit breaker 1 is usually greater than with an alternating current. With a direct current, ventricular fibrillation is therefore caused much more frequently only during the shutdown process in a conventional circuit breaker 1, meaning that the described method and the circuit breaker 1 can reduce the risk of ventricular fibrillation with a direct current significantly more.

Furthermore, the proportion of DC networks is growing owing to the increasing popularity of electromobility. The method and the circuit breaker 1 can therefore be particularly preferably used in a charging process or for operating an electric vehicle. As a result, the risk of a fatal electric shock when charging or operating an electric vehicle, for example due to touching the body of damaged vehicle, can be reduced.

Alternatively, it may be provided that an alternating current is applied between the neutral conductor 3 and the at least one current-carrying conductor 4. The circuit breaker 1 can be designed for alternating current here. In alternating current, the voltage value 2 corresponds to the effective voltage and not to the temporally variable voltage.

Particularly preferably, it may be provided that the shutdown unit 6 comprises at least one semiconductor switch 12 and a control unit 13 that is operatively connected to the at least one semiconductor switch 12, that the shutdown curve 8 is stored in the control unit 13, and that the control unit 13 is configured to control a resistance of the at least one semiconductor switch 12 according to the shutdown curve 8. A semiconductor switch 12 is an electronic component which can carry out the tasks of a mechanical switch owing to the high potential off-state resistance. Owing to the level of an applied control voltage of the control unit 13 at the semiconductor switch 12, the resistance of the semiconductor switch 12 can usually be continuously regulated between an on-state resistance and an off-state resistance. Since the off-state resistance is usually very high, in particular greater than 1 MΩ, but is not infinite, the voltage value 2 cannot be reduced to exactly zero, but to a negligible value which is considered to be substantially zero. As a result, the shutdown curve 8 can simply be stored in the control unit 13 as a retrievable voltage signal having a predetermined progression over time which is applied to the semiconductor switch 12 during a shutdown process. This means that a shutdown process can be easily achieved with a defined shutdown curve 8 that can be effectively predetermined.

The semiconductor switch 12 may in particular be a semiconductor circuit breaker.

The semiconductor switch 12 may in particular comprise a field-effect transistor.

It may further be provided that the shutdown unit 6 comprises mechanical switching contacts in addition to the semiconductor switch 12. Here, the shutdown process is carried out by the semiconductor switch 12 according to the shutdown curve 8, the mechanical switching contacts additionally ensuring galvanic isolation of the circuit once the shutdown process is complete.

In particular, a semiconductor switch 12 can be provided for each of the neutral conductor 3 and the individual current-carrying conductors 4. FIG. 8 shows the different semiconductor switches 12 just as one block.

Alternatively, it may be provided that the shutdown unit 6 implements a progression of the voltage value 2 according to the shutdown curve 8 by a combination of a mechanical switch with additional electrical components, in particular a capacitor. Here, a capacitor may be charged when the circuit breaker 1 is switched on, and discharges when the mechanical switch is opened during a shutdown process, and as a result causes the voltage value 2 to drop in the first time period.

The shutdown curve 8, i.e. the predetermined progression over time of the voltage value 2 during the shutdown process, may have different predetermined forms which are suitable for reducing the occurrence of ventricular fibrillation.

The starting point 9 may in particular be arranged at the start of the shutdown process.

It may further be provided that, when a fault current is detected, the shutdown process is initiated without delay.

According to an embodiment of the shutdown curve 8, it may be provided that the shutdown curve 8 has only at least two sudden-change points 14 of the voltage value 2, with one sudden-change point 14 of the voltage value 2 being at the starting point 9 and another sudden-change point 14 of the voltage value 2 being at the end point 10. A sudden-change point 14 of the voltage value 2 is a sudden drop in the voltage value 2. Instead of a single sudden drop in voltage from the operating voltage 7 to substantially zero, the drop in voltage is divided into a plurality of smaller sudden drops in voltage that are spaced out over time. As a result, the probability of the occurrence of ventricular fibrillation can be reduced.

It may further be provided that the shutdown curve 8 is monotonically decreasing, in particular strictly monotonically decreasing. "Monotonically decreasing" means that the voltage value 2 only drops or remains constant according to the shutdown curve 8. "Strictly monotonically decreasing" means that the voltage value 2 only keeps dropping according to the shutdown curve 8.

Particularly preferably, it may be provided that the shutdown curve 8 is constant at least in part. The shutdown curve 8 can therefore in particular have time regions which are free of sudden-change points 14. The risk of ventricular fibrillation occurring can be significantly reduced by the constant regions of the shutdown curve 8 in which the voltage value 2 decreases continuously and not suddenly.

Particularly preferably, it may be provided that the shutdown curve 8 is constant at least in part, in particular in its entirety. If the shutdown curve 8 is constant in its entirety, the shutdown curve 8 is completely free of sudden-change points 14 of the voltage value 2.

In particular, it may be provided that the shutdown curve 8 is substantially linear at least in part.

Figure 3:
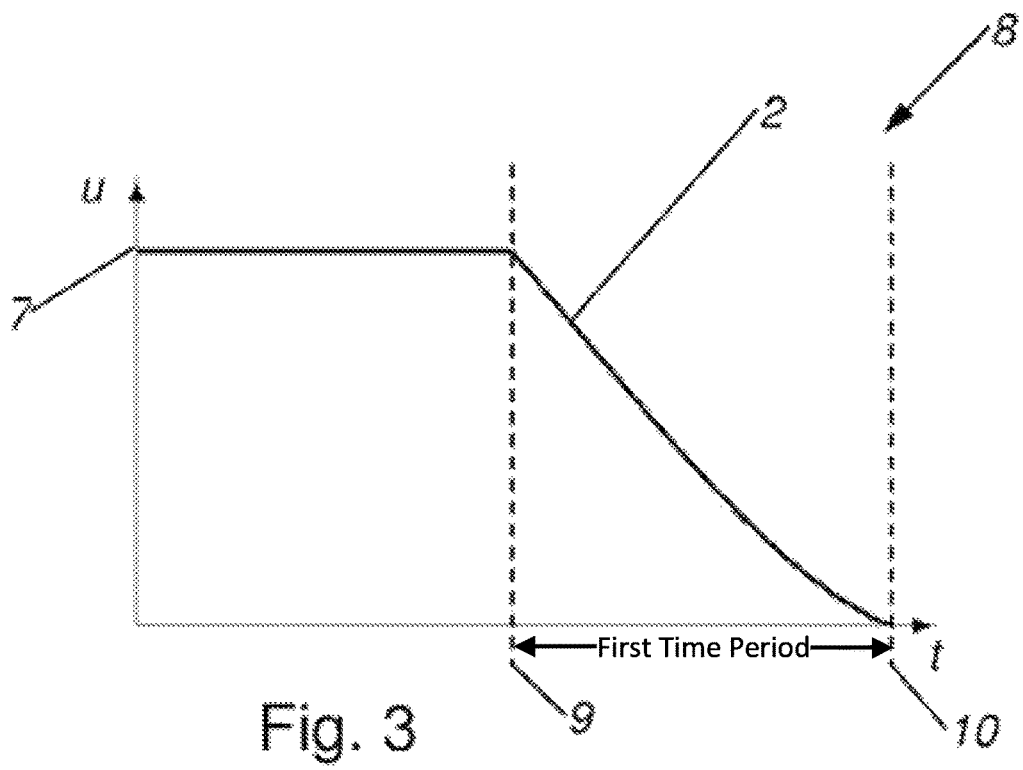
FIG. 3 shows the graph of a first preferred embodiment of a shutdown curve.

By way of example, FIG. 3 shows a shutdown curve 8 which is constant in its entirety and is substantially linear.

It may further be provided that the shutdown curve 8 has at least one constant time region and at least one sudden-change point 14.

Figure 4:
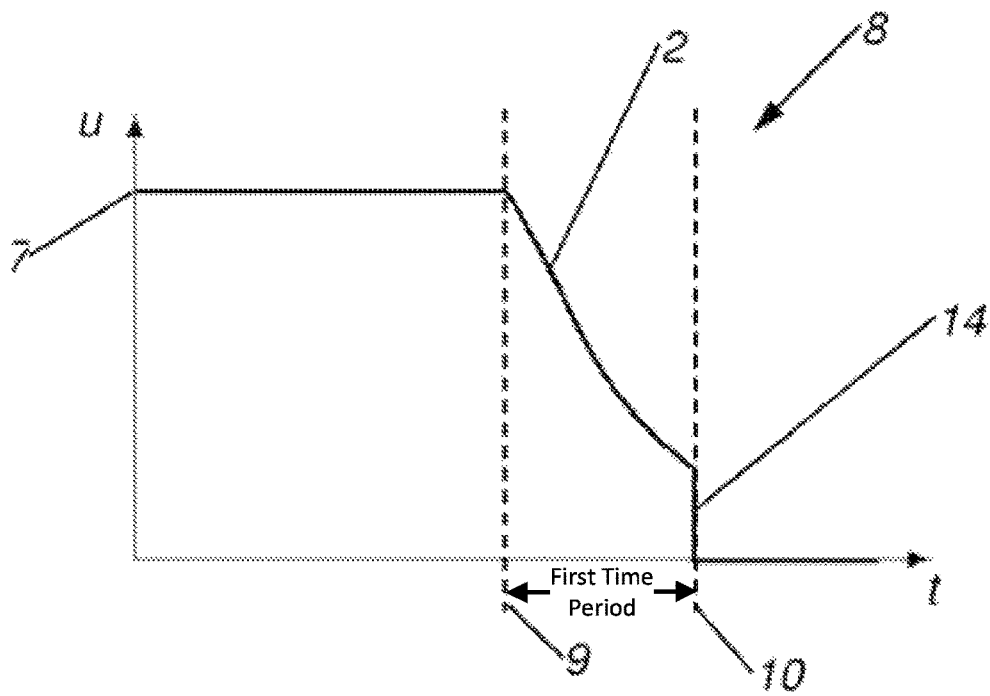
FIG. 4 shows the graph of a second preferred embodiment of a shutdown curve.

It may further be provided that the shutdown curve 8 drops constantly from the starting point 9 to the end point 10 down to a first voltage value 2, and, at the end point 10, comprises a sudden-change point 14 from the first voltage value 2 to substantially zero. By means of the sudden-change point 14 at the end point 10, the voltage value 2 is already decreased to a low value before the sudden-change point 14. As a result, the first time period can be shortened, with it being possible for the probability of the occurrence of ventricular fibrillation to also be kept low. Such a shutdown curve 8 is shown by way of example in FIG. 4.

Particularly preferably, it may be provided that the shutdown curve 8 has at least one sudden-change point 14, and that all the sudden-change points 14 involve a drop in the voltage value 2 of at most 50%, in particular at most 40%, particularly preferably at most 30%, of the operating-voltage value 7. The shutdown curve 8 therefore contains one or more sudden-change points 14, with all the sudden-change points being less than the operating value 7 and not exceeding a drop in voltage of at most 50%, in particular at most 40%, particularly preferably at most 30%, of the operating-voltage value 7. This means that large, sudden drops in the voltage value 2 can be prevented.

Figure 5:
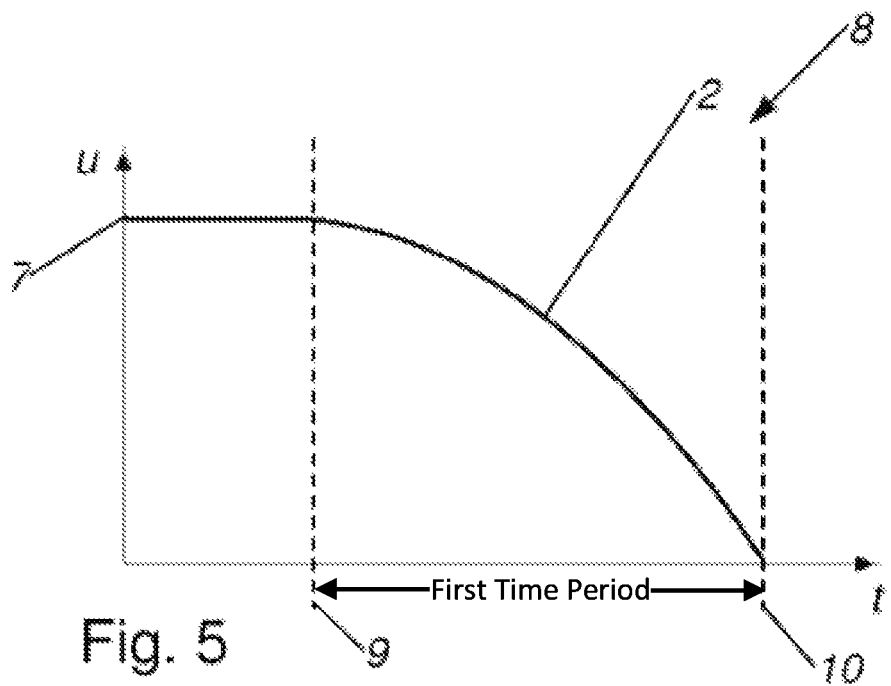
FIG. 5 shows the graph of a third preferred embodiment of a shutdown curve.

It may further be provided that the shutdown curve 8 is substantially convex. With a convex form of the shutdown curve 8, the drop in voltage increases over time. Therefore, the drop in voltage is still low when the voltage value 2 is close to the operating-voltage value 7, whereas the change in the voltage value 2 over time increases as the voltage value 2 continues to drop. As a result, the probability of ventricular fibrillation can be kept low, since the change in the voltage value 2 over time is kept low at high voltage value 2. Such shutdown curves 8 are shown by way of example in FIGS. 5 to 7.

It may further be provided that the shutdown curve 8 is overlaid with a high-frequency signal 15. In particular, a signal having a frequency of between 2 kHz and 100 kHz can be considered to be a high-frequency signal 15. Here, the semiconductor switch 12 is in particular controlled by a signal from the control unit 13, which is a superposition of the shutdown curve 8 and the high-frequency signal 15. The high-frequency signal 15 has the advantage that it is too rapid for reversing the polarity of the cardiac cells, which is why signals having a sufficiently high frequency do not trigger ventricular fibrillation. The high-frequency signal 15 can make the heart less susceptible to the shutdown process, meaning that the probability of ventricular fibrillation can be reduced.

It may in particular be provided that the high-frequency signal 15 has a substantially consistent amplitude. Such a shutdown curve 8 is shown by way of example in FIG. 6.

It may further be provided that the high-frequency signal 15 is configured as a high-frequency periodic interruption in the voltage value 2. Such a shutdown curve 8 is shown by way of example in FIG. 7.

Figure 6:
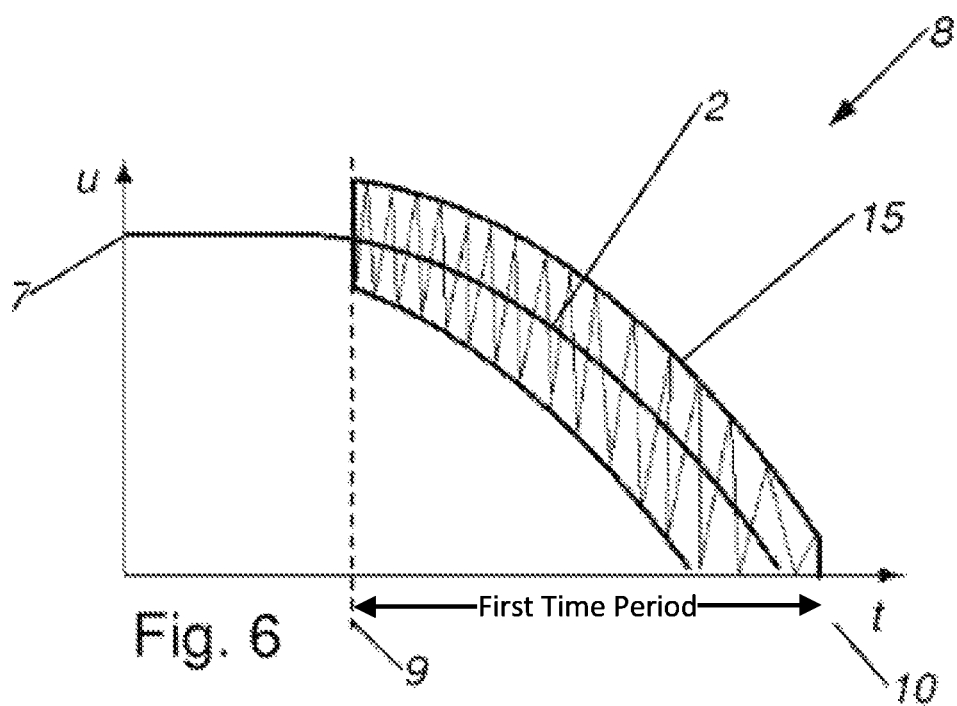
FIG. 6 shows the graph of a fourth preferred embodiment of a shutdown curve.
Figure 7:
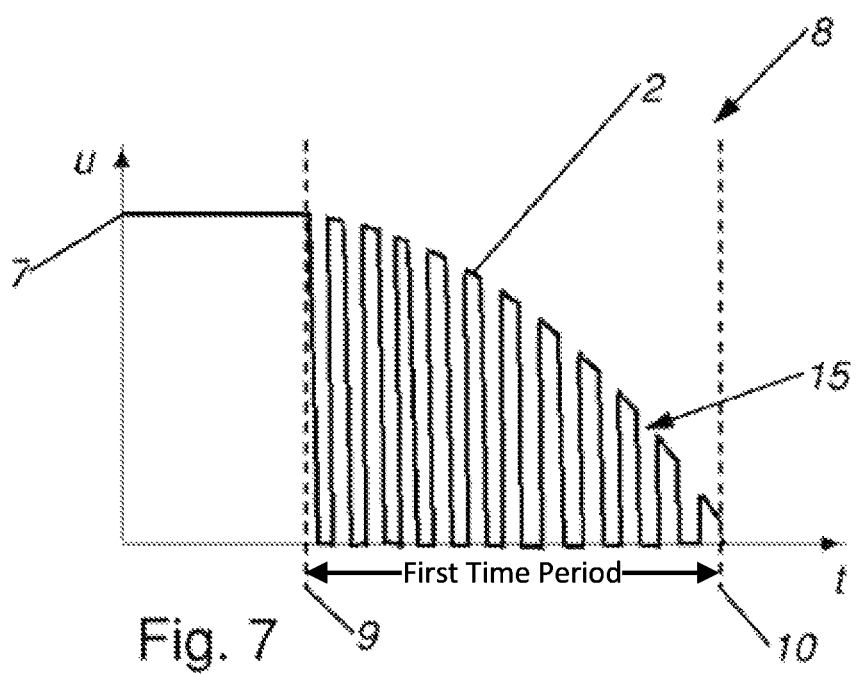
FIG. 7 shows the graph of a fifth preferred embodiment of a shutdown curve.

It should be noted that FIGS. 6 and 7 show the progressions over time of the shutdown curve 8 and the high-frequency signal 15 as well as the amplitude of the high-frequency signal 15 as being severely distorted in parts, since otherwise it would not be possible to display the progression of the high-frequency signal 15.

It may preferably further be provided that the predeterminable first time period is at least 10 ms, in particular at least 20 ms, particularly preferably at least 50 ms. By means of these values for the first time period, the probability can be reduced that the entire drop in voltage of the shutdown curve 8 takes place within the vulnerable phase.

It may preferably further be provided that the predeterminable first time period is at most 100 ms, in particular at most 75 ms, particularly preferably at most 50 ms.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for operating a circuit breaker, comprising:
   initiating a shutdown process when a fault current caused by body contact or ground contact is detected; and
   during the shutdown process, reducing a voltage value of a circuit formed between a neutral conductor and at least one current-carrying conductor at an output of the circuit breaker to substantially zero from an operating-voltage value according to a predetermined shutdown curve by a shutdown unit,
   wherein, the predetermined shutdown curve not being comprised entirely of a single sudden-change point to substantially zero, and during the shutdown process, the circuit is not suddenly interrupted, but the voltage value is reduced from a starting point according to the shutdown curve and only reaches substantially zero after a predetermined first time period, wherein the predetermined first time period is at least 20 ms,
   wherein the predetermined shutdown curve is stored in a control unit, and wherein reducing the voltage value of the circuit according to the predetermined shutdown curve comprises:
      retrieving the predetermined shutdown curve that is stored the control unit; and
      using the retrieved predetermined shutdown curve to reduce the voltage value from the starting point to substantially zero.

2. The method according to claim 1, wherein the shutdown curve is constant at least in part.

3. The method according to claim 1, wherein the shutdown curve is constant in its entirety.

4. The method according to claim 1, wherein the shutdown curve has at least one sudden-change point, and
wherein all the sudden-change points involve a drop in the voltage value of at most 50% of the operating-voltage value.

5. The method according to claim 1, wherein the shutdown curve is substantially convex.

6. The method according to claim 1, wherein the shutdown curve is overlaid with a high-frequency signal.

7. The method according to claim 1, wherein the predetermined first time period is at least 50 ms.

8. The method according to claim 1, wherein using the retrieved predetermined shutdown curve to reduce the voltage value from the starting point to substantially zero comprises controlling a resistance of at least one semiconductor switch according to the retrieved predetermined shutdown curve.

9. A circuit breaker, comprising:
a neutral conductor;
at least one current-carrying conductor; and
a shutdown unit, the shutdown unit comprising a control unit and is configured to carry out a shutdown process when a fault current caused by body contact or ground contact is detected by a fault-current detector, wherein the control unit stores a predetermined shutdown curve,
wherein, during the shutdown process, the shutdown unit is configured to reduce a voltage value of a circuit formed between the neutral conductor and the at least one current-carrying conductor at an output of the circuit breaker to substantially zero from an operating-voltage value according to the predetermined shutdown curve,
wherein, the predetermined shutdown curve not being comprised entirely of a single sudden-change point to substantially zero, and during the shutdown process, the circuit not being suddenly interrupted, but the voltage value being reduced from a starting point according to the shutdown curve and only reaching substantially zero after a predetermined first time period, wherein the predetermined first time period is at least 20 ms,
wherein the shutdown unit is configured to reduce the voltage value of the circuit according to the predetermined shutdown curve by:
retrieving the predetermined shutdown curve that is stored in the control unit; and
using the retrieved predetermined shutdown curve to reduce the voltage value from the starting point to substantially zero.

10. The circuit breaker according to claim 9, wherein the shutdown unit comprises at least one semiconductor switch that is operatively connected to the control unit,
and
wherein the control unit is configured to control a resistance of the at least one semiconductor switch according to the shutdown curve.

11. The circuit breaker according to claim 9, wherein the shutdown curve has at least one sudden-change point, and wherein all the sudden-change points involve a drop in the voltage value of at most 40% of the operating-voltage value.

12. The circuit breaker according to claim 11, wherein all the sudden-change points involve a drop in the voltage value of at most 30% of the operating-voltage value.

* * * * *